Figure 1:
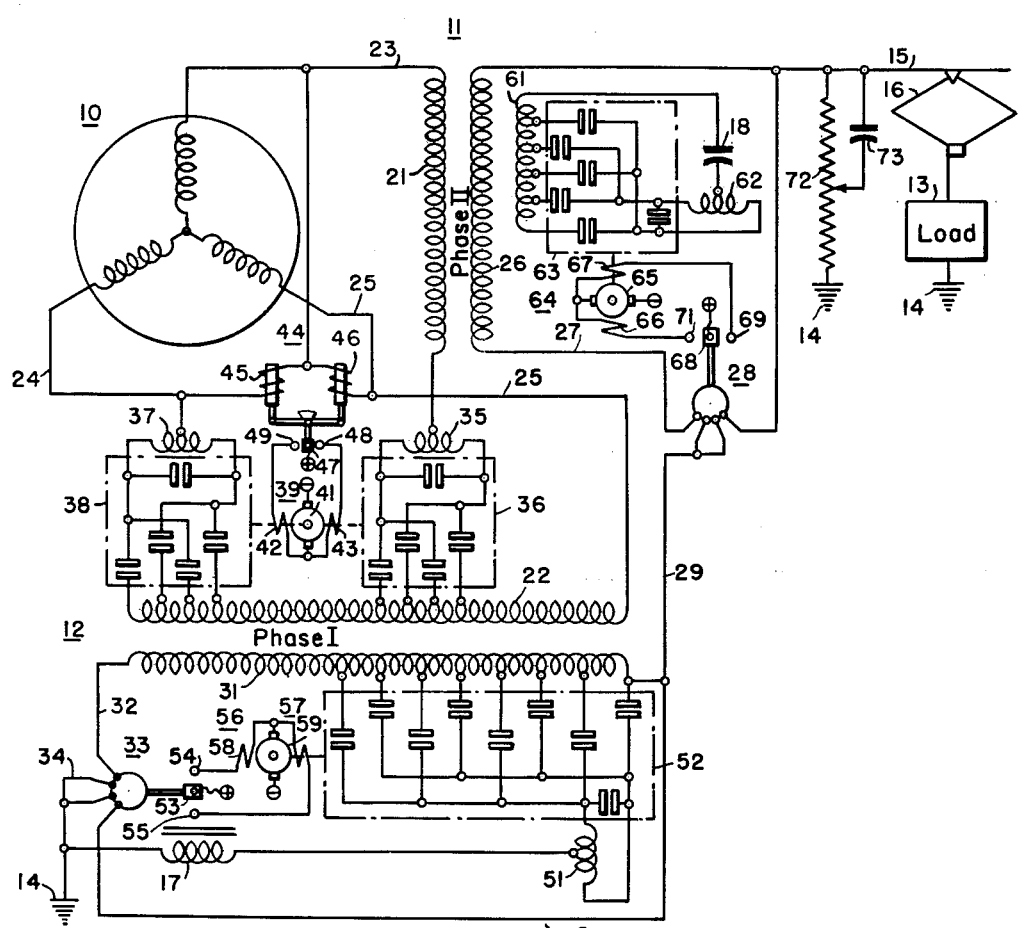

Oct. 28, 1952  L. J. HIBBARD  2,616,071
STATIC PHASE BALANCER
Filed July 12, 1950

WITNESSES:
E. A. McCloskey
Wm. L. Groom

INVENTOR
Lloyd J. Hibbard.
BY
ATTORNEY

Patented Oct. 28, 1952

2,616,071

UNITED STATES PATENT OFFICE 2,616,071

STATIC PHASE BALANCER

Lloyd J. Hibbard, Pittsburgh, Pa., assignor to Westinghouse Electric Corporation, East Pittsburgh, Pa., a corporation of Pennsylvania Application July 12, 1950, Serial No. 173,437

15 Claims. (Cl. 321—52)

My invention relates, generally, to phase converters or balancers and, more particularly, to phase balancers of the static network type.

The application of electronic rectifiers to electric locomotives for converting alternating current to direct current for the traction motors of the locomotives makes it possible to utilize 60 cycle alternating current power in place of the lower frequencies heretofore utilized. The application of 60 cycle power to electric locomotives makes it possible to utilize the same transmission line to transmit power for railway and other commercial purposes without providing frequency changers.

The advantages of three-phase power generation and transmission are well known, but it is impractical to transmit three-phase power to an electric locomotive or other railway vehicle. Therefore, it is desirable to provide phase converters or balancers at predetermined locations in a railway system for converting three-phase power to single-phase power for transmission to the locomotives by single-phase trolley conductors. In general, the phase converters previously utilized have been of the rotating type.

An object of my invention, generally stated, is to provide a static phase balancer which shall be simple and efficient in operation, and which may be economically manufactured and installed.

A more specific object of my invention is to automatically maintain balanced phase and voltage conditions in a static network for converting three-phase power to single-phase power.

Another object of my invention is to automatically maintain a predetermined power factor or phase relation between the current and the voltage in a static phase balancer.

Other objects of my invention will be explained fully hereinafter, or will be apparent to those skilled in the art.

In practicing my invention, three-phase power is converted to single-phase power by means of a static network comprising Scott-connected transformers and a reactor and a capacitor connected to the transformers to secure the desired phase relationships of current and voltage. The primary connections of the transformers are automatically controlled by a voltage responsive relay to compensate for supply impedance drops and to maintain balanced primary voltages. The connections for the reactor and the capacitor are automatically controlled by power factor relays to maintain desired phase relationships in the secondary windings. The power factor of the load current may be maintained at a desired amount by means of an autotransformer and a capacitor connected to the load circuit.

Figure 2:
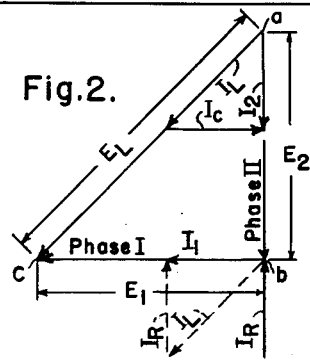

For a better understanding of the nature and objects of my invention, reference may be had to the following detailed description, taken in conjunction with the accompanying drawing, in which:

Figure 1 is a diagrammatic view of a static phase balancing network embodying the principal features of my invention, and Fig. 2 is a vector diagram of the network shown in Fig. 1.

Referring to Fig. 1 of the drawing, the system shown therein comprises, generally, a source of three-phase alternating current power 10, which may be either a three-phase generator driven by a suitable prime-mover (not shown), or a three-phase transformer which is energized from a three-phase source of power; Scott-connected transformers 11 and 12, and a single-phase useful load 13. The load 13 is connected between ground at 14 and a single-phase trolley conductor 15 which is engaged by a current collector 16. The trolley conductor 15 is energized from a phase balancing network comprising the Scott-connected transformers 11 and 12, an inductive reactive loading-means such as a reactor 17, and a capacitive reactive loading-means such as a capacitor 18, which function to convert the three-phase power from the source 10 to single-phase power for the useful load 13.

In accordance with the well known Scott connection for transformers, one terminal of a primary winding 21 of the tranformer 11 is connected to substantially the midpoint of a primary winding 22 of the transformer 12. The other terminal of the primary winding 21 is connected through a conductor 23 to one line-phase of the three-phase source of power 10. One terminal of the primary winding 22 of the transformer 12 is connected through a conductor 24 to another line-phase of the three-phase source 10. The other terminal of the primary winding 22 is connected through a conductor 25 to another line-phase of the three-phase source 10.

One terminal of a secondary winding 26 of the transformer 11 is connected to the trolley conductor 15. The other terminal of the secondary winding 26 is connected through a conductor 27 to a power factor relay 28 and thence through a conductor 29 to one terminal of a secondary winding 31 of the transformer 12. The other terminal of the secondary winding 31 is connected through a conductor 32 to a power factor relay 33 and thence to ground 14 through a conductor 34. The function of the power factor relays 28 and 33 will be explained more fully hereinafter.

In order to compensate for supply impedance drops, and maintain phase I and phase II at right angles to each other, provision is made for automatically varying the connections of the primary winding 21 to the primary winding 22 and the connections of the primary winding 22 to the one phase of the three-phase source 10. As shown, the primary winding 21 is connected to the primary winding 22 through a preventive coil 35 and a tap-changing mechanism 36. Likewise, the one phase of the power source 10 is connected to the primary winding 22 through a preventive coil 37 and a tap-changing mechanism 38.

The tap-changing mechanisms 36 and 38 may be of a type well known in the transformer art for changing taps to transformer windings under load conditions. As shown, they may be operated by a motor 39 having an armature winding 41, a field winding 42 which is energized for one direction of rotation, and a field winding 43 which is energized for the other direction of rotation of the motor.

The operation of the motor 39 may be controlled by a voltage responsive relay 44 which is of the balanced beam type. The relay 44 has one coil 45 connected across the delta-phase between the power-line conductors 23 and 24, and another coil 46 connected across the delta-phase between the power-line conductors 23 and 25. A movable contact member 47 is disposed between fixed contact members 48 and 49. When the voltage across conductors 23 and 24 is equal to the voltage across conductors 23 and 25, the contact member 47 remains in its mid-position between the contact members 48 and 49.

If the voltage impressed on one coil of the relay, for example, the coil 45, becomes greater than that impressed on the coil 46 because of an unbalanced voltage condition, caused by impedance drops resulting from the load current, the contact member 47 engages the contact member 49 to energize the field winding 42 and the armature winding 41, thereby causing the motor 39 to operate the tap-changing mechanisms 36 and 38 in a direction to vary the connections to the transformer winding 22 to correct the unbalanced conditions by shifting the points of connection of the primary winding 21 and the phase conductor 24 to the secondary winding 22. When the voltage conditions across the conductors to which the coils 45 and 46 are connected are returned to normal, the coil 46 of the relay 44 causes the contact member 47 to engage the contact member 48, thereby energizing the field winding 43 and the armature winding 41 to cause the motor 39 to operate the tap-changing mechanisms 36 and 38 in the reverse direction to return the connections to the primary winding 22 to their original position. In this manner, phase I and phase II are maintained at right angles to each other and balanced voltage conditions are maintained.

The reactor 17 and the capacitor 18 are utilized respectively as inductive and capacitance load-ing-means connected in shunt relation to impose controllable inductive and capacitive reactive auxiliary loads on the respective secondary windings 31 and 26, in order to secure the desired power factor or phase relationship of current and voltage in the respective transformer windings. As shown, the reactor 17 is connected between ground 14 and the secondary winding 31 of the transformer 12 through a preventive coil 51 and a tap-changing mechanism 52. In order to keep the total of useful-load and auxiliary reactive current in phase I at unity power factor, the operation of the tap-changing mechanism 52 is automatically controlled by the power factor relay 33, which is connected to be responsive to the power factor of the current in phase I. The relay 33 has a movable contact member 53 disposed between fixed contact members 54 and 55. The tap-changing mechanism 52 may be of the type utilized for changing taps on transformer windings under load. It is operated by a motor 56 having an armature winding 57, a field winding 58 which is energized for one direction of operation, and a field winding 59 which is energized for the other direction of operation.

The power-factor relay 33 controls the operation of the motor 56 which, in turn, operates the tap-changing mechanism 52 to vary the connection of the reactor 17 to the transformer winding 31, thereby varying the voltage impressed across the reactor 17, which, in turn, varies the effect of the reactor 17 in controlling the phase position of the current with respect to the voltage in phase I. It will be understood that a reactor having taps thereon could be provided, and the connections between the reactor and the transformer varied by a tap-changing mechanism similar to the mechanism 52 to secure the same effect.

In the other phase, the capacitor 18 is coupled with the transformer 11 by means of a tertiary winding 61. The capacitor 18 is connected across the tertiary winding 61 through a preventive coil 62 and a tap-changing mechanism 63. The mechanism 63 is operated by a motor 64 having an armature winding 65, a field winding 66 which is energized for one direction of operation, and a field winding 67 which is energized for the other direction of operation of the motor.

The power factor relay 28, which is connected to be responsive to the power factor of the total of useful-load and auxiliary reactive current in phase II, is provided with contact members 68, 69 and 71 for controlling the operation of the motor in the manner hereinbefore described. Thus, the relay 28 functions to change the connections of the capacitor 18 to the transformer winding 61 to maintain unity power factor in phase II.

It will be understood that the capacitor 18 could be connected directly to taps on the transformed winding 26, if desired. Likewise, the reactor 17 could be coupled with the transformer 12 by means of a tertiary winding similar to the winding 61, if desired.

An autotransformer 72 and a capacitor 73 may be provided to maintain unity power factor in the load circuit if desired. As shown, the transformer 72 may be connected between ground 14 and the load conductor 15. The capacitor 73 may be connected between the load conductor 15 and variable taps on the transformer 72. A tap-changing mechanism, similar to the mechanism hereinbefore described, and a power factor relay responsive to the power factor of the load current may be provided for controlling the connections of the capacitor 73 to the transformer 72, thereby controlling the effect of the capacitor 73 to maintain unity power factor of the load current.

As shown by the vector diagram in Fig. 2, in which it is assumed that the load current is maintained at unity power factor, the load voltage $E_L$ is the vector sum of $E_1$, which is the voltage of phase I, and the voltage $E_2$, which is the voltage of phase II. Voltage $E_1$ equals $.7071E_L$. Likewise, voltage $E_2$ equals $.7071E_L$. The load current $I_L$ is in phase with the load voltage $E_L$ since it has been assumed that the load current is maintained at unity power factor. The load current $I_L$ is equal to the vector sum of the current $I_1$, which is the current in phase I, and the current $I_2$, which is the current in phase II. $I_1$ equals $.7071I_L$, and $I_2$ equals $.7071I_L$. The load KVA equals $E_L I_L$.

The current in the reactor 17, designated by the symbol $I_R$, lags the current $I_1$ by 90°. The current in the capacitor 18, designated by $I_C$, leads the current $I_2$ by 90°.

As shown, the load current $I_L$ is also equal to the vector sum of $I_R$ and $I_1$, or to the vector sum of $I_C$ and $I_2$. Thus, $I_R$ equals $.7071I_L$ and $I_C$ equals $.7071I_L$. Therefore, the reactor $$KVA = (.7071E_L)(.7071I_L) = \frac{E_L I_L}{2}$$

and the capacitor $$KVA = (.7071E_L)(.7071I_L) = \frac{E_L I_L}{2}$$

In other words, the KVA value of the reactor necessary to maintain unity power factor in phase I is ½ the load KVA value, and the capacitor KVA value necessary to maintain unity power factor in phase II is ½ the load KVA value.

From the foregoing description, it is apparent that I have provided a static phase balancing network which may be utilized for converting three-phase power to single-phase power, and which may be automatically controlled to maintain desired phase relationships between the current and the voltage in the components of the network. Since no rotating apparatus is required, the losses incurred in rotating apparatus are eliminated, thereby increasing the efficiency of the phase balancing network as compared with phase balancers or converters utilizing rotating apparatus.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A static phase balancer for interconnecting a three-phase power circuit and a single-phase load circuit comprising, in combination, Scott-connected transformers having primary windings for connection to the three-phase power circuit and secondary windings for connection to the single-phase load circuit, reactance means connected in shunt relation to impose a controllable inductive reactive auxiliary load on one secondary winding only, capacitance means connected in shunt relation to impose a controllable capacitive reactive auxiliary load on the other secondary winding only, said secondary windings having two terminals connected together, the other terminals of said secondary windings being available for connection directly to the load circuit, control means for varying said reactance and said capacitance means each independently of the other, and relay means for controlling the operation of said control means.

2. A static phase balancer for interconnecting a three-phase power circuit and a single-phase load circuit comprising, in combination, Scott-connected transformers having primary windings for connection to the three-phase power circuit and secondary windings for connection to the single-phase load circuit, reactance means connected in shunt relation to impose a controllable inductive reactive auxiliary load on one secondary winding only, capacitance means connected in shunt relation to impose a controllable capacitive reactive auxiliary load on the other secondary winding only, said secondary windings having two terminals connected together, the other terminals of said secondary windings being available for connection directly to the load circuit, control means for varying said reactance and said capacitance means each independently of the other, and power factor relay means for controlling the operation of said control means.

3. A static phase balancer for interconnecting a three-phase power circuit and a single-phase load circuit comprising, in combination, Scott-connected transformers having primary windings for connection to the three-phase power circuit and secondary windings for connection to the single-phase load circuit, reactance means connected in shunt relation to impose a controllable inductive reactive auxiliary load on one secondary winding only, capacitance means connected in shunt relation to impose a controllable capacitive reactive auxilary load on the other secondary winding only, said secondary windings having two terminals connected together, the other terminals of said secondary windings being available for connection directly to the load circuit, control means for varying said reactance and said capacitance means each independently of the other, and relay means responsive to the power factor of the current in the secondary windings for controlling the operation of said control means.

4. A static phase balancer for interconnecting a three-phase power circuit and a single-phase load circuit comprising, in combination, Scott-connected transformers having primary windings for connection to the three-phase power circuit and secondary windings for connection to the single-phase load circuit, reactance means connected in shunt relation to impose a controllable inductive reactive auxiliary load on one secondary winding only, capacitance means connected in shunt relation to impose a controllable capacitive reactive auxiliary load on the other secondary winding only, said secondary windings having two terminals connected together, the other terminals of said secondary windings being available for connection directly to the load circuit, control means for varying said reactance means independently of the capacitance means, relay means for controlling the operation of said control means, additional control means for varying said capacitance means independently of the reactance means, and additional relay means for controlling the operation of said additional control means.

5. A static phase balancer for interconnecting a three-phase power circuit and a single-phase load circuit comprising, in combination, Scott-connected transformers having primary windings for connection to the three-phase power circuit and secondary windings for connection to the single-phase load circuit, reactance means connected in shunt relation to impose a controllable inductive reactive auxiliary load on one secondary winding only, capacitance means connected in shunt relation to impose a controllable capacitive reactive auxiliary load on the other secondary winding only, said secondary windings having two terminals connected together, the other terminals of said secondary windings being available for connection directly to the load circuit, control means for varying said reactance means independently of the capacitance means, a power factor relay for controlling the operation of said control means, additional control means for varying said capacitance means independently of the reactance means, and an additional power factor relay for controlling the operation of said additional control means.

6. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, one terminal of one secondary winding being connected to one terminal of the other secondary winding, the other terminals of the two secondary windings being available for connection directly to the load circuit, an inductive reactive loading-means connected in shunt relation to impose a controllable inductive reactive auxiliary load on one secondary winding, a capacitance reactive loading-means connected in shunt relation to impose a controllable capacitance reactive auxiliary load on the other secondary winding, and an independent current-phase-responsive means associated with each secondary winding for so controlling its associated reactive loading-means as to automatically maintain a predetermined current-phase relation between the total of useful-load and auxiliary current and the voltage of the associated secondary winding.

7. A static phase balancer for interconnecting a three-phase power circuit and a single-phase useful-load circuit comprising, in combination, two transformers having primary windings for Scott-connection to the three-phase power circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit, and an adjustable-tap connection near the other terminal of said other primary winding, and a differential voltage-responsive means for comparing the delta-phase voltage between the first and second line-phases with the delta-phase voltage between the first and third line-phases and for automatically simultaneously varying both of said adjustable-tap connections in one direction or the other according as the one delta-phase voltage or the other is the larger.

8. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit and an adjustable-tap connection near the other terminal of said other primary winding, a differential voltage-responsive means for comparing the delta-phase voltage between the first and second line-phases with the delta-phase voltage between the first and third line-phases and for automatically simultaneously varying both of said adjustable-tap connections in one direction or the other according as the one delta-phase voltage or the other is the larger, one terminal of one secondary winding being connected to one terminal of the other secondary winding, and the other terminals of the two secondary windings being available for connection directly to the load circuit.

9. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit and an adjustable-tap connection near the other terminal of said other primary winding, a differential voltage-responsive means for comparing the delta-phase voltage between the first and second line-phases with the delta-phase voltage between the first and third line-phases and for automatically simultaneously varying both of said adjustable-tap connections in one direction or the other according as the one delta-phase voltage or the other is the larger, one terminal of one secondary winding being connected to one terminal of the other secondary winding, the other terminals of the two secondary windings being available for connection directly to the load circuit, an inductive reactive loading-means connected in shunt relation to impose a controllable inductive reactive auxiliary load on one secondary winding, a capacitive reactive loading-means connected in shunt relation to impose a controllable capacitive reactive auxiliary load on the other secondary winding, and an independent current-phase-responsive means associated with each secondary winding for so controlling its associated reactive loading-means as to automatically maintain a predetermined current-phase relation between the total of useful-load and auxiliary current and the voltage of the associated secondary winding.

10. A static phase balancer for interconnecting a three-phase power circuit and a single-phase useful-load circuit comprising, in combination, two transformers having primary windings for Scott-connection to the three-phase power circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit and the other terminal of said other primary winding, at least one of the line-phase connections including an adjustable-tap terminal-connection on the associated primary winding, and differential voltage-responsive means, energized from a plurality of different delta-phases between the several line-phases and having operative-means for so controlling said adjustable-tap connections as to tend to automatically maintain balanced-voltage conditions.

11. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit and the other terminal of said other primary winding, at least one of the line-phase connections including an adjustable-tap terminal-connection on the associated primary winding, differential voltage-responsive means, energized from a plurality of different delta-phases between the several line-phases and having operative-means for so controlling said adjustable-tap connections as to tend to automatically maintain balanced-voltage conditions, one terminal of one secondary winding being connected to one terminal of the other secondary winding, and the other terminals of the two secondary windings being available for connection directly to the load circuit.

12. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and an adjustable-tap connection near the middle of the other primary winding, a connection between one terminal of said other primary winding and a second line-phase of the three-phase power circuit, and a connection between the third line-phase of the three-phase power circuit and the other terminal of said other primary winding, at least one of the line-phase connections including an adjustable-tap terminal-connection on the associated primary winding, differential voltage-responsive means, energized from a plurality of different delta-phases between the several line-phases and having operative-means for so controlling said adjustable-tap connections as to tend to automatically maintain balanced-voltage conditions, one terminal of one secondary winding being connected to one terminal of the other secondary winding, the other terminals of the two secondary windings being available for connection directly to the load circuit, an inductive reactive loading-means connected in shunt relation to impose a controllable inductive reactive auxiliary load on one secondary winding, a capacitive reactive loading-means connected in shunt relation to impose a controllable capacitive reactive auxiliary load on the other secondary winding, and an independent current-phase-responsive means associated with each secondary winding for so controlling its associated reactive loading-means as to automatically maintain a predetermined current-phase relation between the total of useful-load and auxiliary current and the voltage of the associated secondary winding.

13. A static phase balancer for interconnecting a three-phase power circuit and a single-phase useful-load circuit comprising, in combination, two transformers having primary windings for Scott-connection to the three-phase power circuit, said Scott-connection including a connection between one terminal of one primary winding and one line-phase of the three-phase power circuit, a connection between the other terminal of the same primary winding and a connection near the middle of the other primary winding, a connection between one terminal of said other primary winding and a second line-phase of the three-phase power circuit, and a connection between the third line-phase of the three-phase power circuit and the other terminal of said other primary winding, at least one of the three connections to said other primary winding including an adjustable-tap connection on said other primary winding, and differential voltage-responsive means, energized from a plurality of different delta-phases between the several line-phases and having operative-means for so controlling said adjustable-tap connection as to tend to automatically maintain balanced-voltage conditions.

14. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and a connection near the middle of the other primary winding, a connection between one terminal of said other primary winding and a second line-phase of the three-phase power circuit, and a connection between the third line-phase of the three-phase power circuit and the other terminal of said other primary winding, at least one of the three connections to said other primary winding including an adjustable-tap connection on said other primary winding, differential voltage-responsive means, energized from a plurality of different delta-phases between the several line-phases and having operative-means for so controlling said adjustable-tap connection as to tend to automatically maintain balanced-voltage conditions, one terminal of one secondary winding being connected to one terminal of the other secondary winding, and the other terminals of the two secondary windings being available for connection directly to the load circuit.

15. A static phase balancer for interconnecting a three-phase power circuit and a single-phase useful-load circuit comprising, in combination, two transformers having primary windings for Scott-connection to the three-phase power circuit and secondary windings for connection to the single-phase load circuit, said Scott-connection including a connection between one terminal of one primary winding and one line-phase of the three-phase power circuit, a connection between the other terminal of the same primary winding and a connection near the middle of the other primary winding, a connection between one terminal of said other primary winding and a second line-phase of the three-phase power circuit, and a connection between the third line-phase of the three-phase power circuit and the other terminal of said other primary winding, at least one of the three connections to said other primary winding including an adjustable-tap connection on said other primary winding, differential voltage-responsive means, energized from a plurality of different delta-phases between the several line-phases and having operative-means for so controlling said adjustable-tap connection as to tend to automatically maintain balanced-voltage conditions, one terminal of one secondary winding being connected to one terminal of the other secondary winding, the other terminals of the two secondary windings being available for connection directly to the load circuit, an inductive reactive loading-means connected in shunt relation to impose a controllable inductive reactive auxiliary load on one secondary winding, a capacitive reactive loading-means connected in shunt relation to impose a controllable capacitive reactive auxiliary load on the other secondary winding, and an independent current-phase-responsive means associated with each secondary winding for so controlling its associated reactive loading-means as to automatically maintain a predetermined current-phase relation between the total of useful-load and auxiliary current and the voltage of the associated secondary winding.

LLOYD J. HIBBARD.

REFERENCES CITED

The following references are of record in the file of this patent:

UNITED STATES PATENTS

| Number | Name | Date |
|---|---|---|
| Re. 14,978 | Fortescue | Nov. 9, 1920 |
| 1,248,531 | Nottage | Dec. 4, 1917 |
| 1,281,956 | Hellmund | Oct. 15, 1918 |
| 1,521,017 | Fortescue | Dec. 30, 1924 |
| 1,843,521 | Smith | Feb. 2, 1932 |
| 2,099,716 | Young | Nov. 23, 1937 |
| 2,253,053 | Stevens | Aug. 19, 1941 |
| 2,359,768 | Kiltie | Oct. 10, 1944 |
| 2,453,263 | Potter | Nov. 9, 1948 |